United States Patent
Verma (10) Patent No.: US 9,529,644 B1
(45) Date of Patent: Dec. 27, 2016

(54) INCREASING THE EFFICIENCY OF SCHEDULED AND UNSCHEDULED COMPUTING TASKS

(71) Applicant: International Business Machines Corporation, Armonk, NY (US)

(72) Inventor: Sunil Verma, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/977,703

(22) Filed: Dec. 22, 2015

Related U.S. Application Data (63) Continuation of application No. 14/794,901, filed on Jul. 9, 2015.

(51) Int. Cl.
 G06F 9/46 (2006.01)
 G06F 17/30 (2006.01)
 G06F 9/52 (2006.01)

(52) U.S. Cl.
 CPC ........... *G06F 9/52* (2013.01); *G06F 17/30424* (2013.01)

(58) Field of Classification Search
 None
 See application file for complete search history.

(56) References Cited

U.S. PATENT DOCUMENTS

| 8,181,181 | B2 | 5/2012 | Ioannou |
| 8,286,183 | B2 | 10/2012 | Baird et al. |
| 8,645,182 | B2 | 2/2014 | Johnson et al. |
| 8,863,021 | B1 | 10/2014 | Bee |
| 2004/0187113 | A1 | 9/2004 | Viassolo |
| 2010/0169146 | A1 | 7/2010 | Hoyne et al. |
| 2011/0307286 | A1 | 12/2011 | Haynes et al. |
| 2012/0005597 | A1* | 1/2012 | Eberlein ............... G06F 9/4881 715/751 |
| 2012/0254634 | A1* | 10/2012 | Chakra ..................... G06F 1/28 713/300 |
| 2013/0247055 | A1 | 9/2013 | Berner et al. |
| 2015/0033237 | A1 | 1/2015 | Piazza et al. |

OTHER PUBLICATIONS

Refanidis et al., "On Scheduling Events and Tasks by an Intelligent Calendar Assistant", Copyright © 2009, Association for the Advancement of Artificial Intelligence, pp. 43-52, provided on search report dated Jan. 31, 2015.

(Continued)

*Primary Examiner* — Lewis A Bullock, Jr.
*Assistant Examiner* — Wynuel Aquino
(74) *Attorney, Agent, or Firm* — Adolph Bohnstedt (57) ABSTRACT

One or more processors determine that a user is attempting to execute an unscheduled computing task and estimate the time for execution. One or more processors determine that a computing task is scheduled to execute along with the unscheduled computing task. One or more processors warn the user that the computing task is scheduled to execute along with the unscheduled computing task. One or more processors estimate one or both of: a utilization of processing and a memory consumption for the computing tasks and determine whether a threshold will be exceeded. If the threshold will be exceeded, one or more processors warn the user.

1 Claim, 5 Drawing Sheets

(56) References Cited

OTHER PUBLICATIONS

"A system and method of automatic and intelligent tasks planning in Calendar", An IP.com Prior Art Database Technical Disclosure, Authors et. al.: Disclosed Anonymously, IP.com No. 000220248, IP.com Electronic Publication: Jul. 27, 2012, pp. 1-7.
U.S. Appl. No. 14/794,901, Entitled "Increasing the Efficiency of Scheduled and Unscheduled Computing Tasks", filed Jul. 9, 2015.
Appendix P.: List of IBM Patents or Patent Applications Treated as Related, 2 pages.

\* cited by examiner

FIG. 5

INCREASING THE EFFICIENCY OF SCHEDULED AND UNSCHEDULED COMPUTING TASKS

BACKGROUND OF THE INVENTION

The present invention relates generally to the field of computer efficiency, and more particularly to helping a computer user increase computer efficiency.

Many tasks scheduled on calendar programs require certain amounts of processing, memory and execution time. For example, scheduled meetings where screen sharing occurs require computing resources. Screen sharing is often used to accomplish tasks such as viewing runtime reports, which also require CPU utilization and memory consumption. Other schedulable tasks that consume computing resources include, for example, virtual training.

Executing two or more computing tasks simultaneously often results in poor computing performance. Poor computing performance can manifest itself as slow computing or even program malfunctions, such as freezing and crashing. In general, overloading a computer CPU and memory is often harmful to the computer and wastes time.

SUMMARY

Embodiments of the present invention provide a method, system, and program product to facilitate computer efficiency. One or more processors determine that a user is attempting to execute an unscheduled computing task. One or more processors estimate a length of time of execution for the unscheduled computing task. One or more processors determine that a scheduled computing task is scheduled to execute while the unscheduled computing task is executing, wherein the scheduled computing task is scheduled to be executed automatically or manually and the scheduled computing task occurs during one or more of: an event scheduled in a calendar program, a software update, and a computer backup. One or more processors warn the user that the unscheduled computing task will be executing when the scheduled computing task begins executing. One or more processors estimate one or both of: a utilization of processing and a memory consumption for one or both of: the unscheduled computing task and the scheduled computing task. One or more processors determine whether the one or both of: the utilization of processing and the memory consumption for the one or both of: the unscheduled computing task and the scheduled computing task exceed a threshold. In response to a determination that the threshold will be exceeded, one or more processors warn the user that the threshold will be exceeded. One or more processors analyze at least one of the unscheduled computing task and the scheduled computing task for one or more first identifying attributes. One or more processors search a database for one or more stored computing tasks that have one or more second identifying attributes. One or more processors identify a predictive correlation between at least one of the one or more first identifying attributes and at least one of the one or more second identifying attributes, wherein the predictive correlation allows an estimate to be made of one or more of: the utilization of processing and the memory consumption and wherein the one or more first identifying attributes and the one or more second identifying attributes include one or more of: a file size, a file type, and a program language used, and the length of time of execution for one or both of: the unscheduled computing task and the scheduled computing task.

DETAILED DESCRIPTION

Computing tasks that require CPU utilization and memory consumption are often scheduled using, for example, a calendar application. Often these scheduled computing tasks, which are executed either manually or automatically, compete against other unscheduled computing tasks that also require computer resources. If CPU- and memory-intensive computing tasks compete against each other at the same time, computer sluggishness and malfunctions often occur.

Scheduled computing tasks are executed at known future times, unlike non-scheduled computing tasks. Thus, a thoughtful user may elect to postpone the execution of an unscheduled computing task if he or she knows that a scheduled computing task will be executing at the same time. Unfortunately, scheduled computing tasks are often initiated while unscheduled computing tasks are executing because, for example, a user did not know how long the unscheduled computing task would take or the user was not thinking about the scheduled computing task when he or she initiated the unscheduled computing task.

Embodiments of the present invention recognize that executing multiple computing tasks at the same time on a computing device is often less efficient than executing the multiple computing tasks separately. Embodiments of the present invention provide a method, computer program product, and computer system that estimates the amount of processing and memory a given computing task will consume along with an estimate of the length of time of execution, i.e., execution time. Embodiments of the present invention provide a method, computer program product, and computer system to warn a user when an unscheduled computing task will likely execute at the same time as a scheduled computing task.

The present invention will now be described in detail with reference to the Figures.

Figure 1:
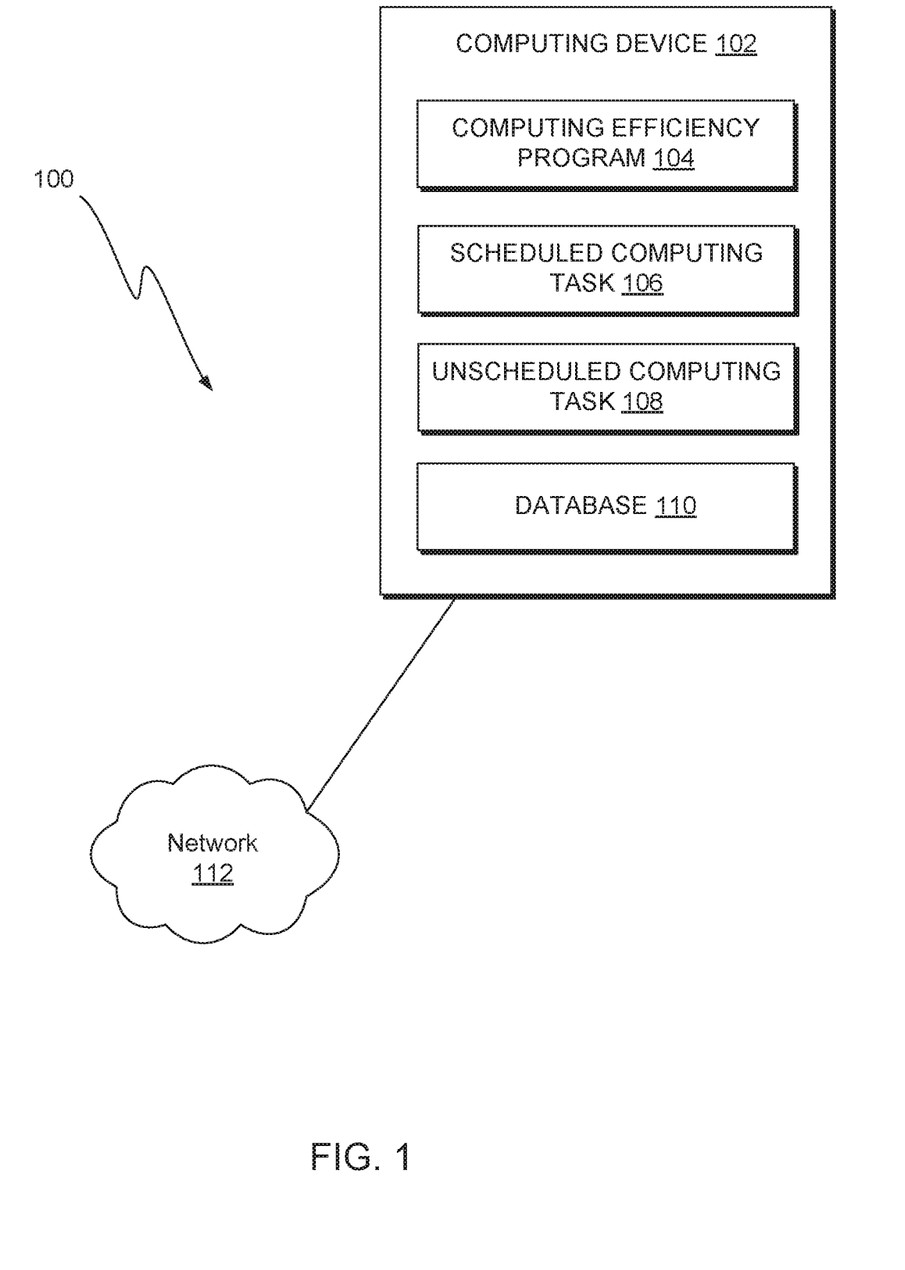
FIG. 1 is a functional block diagram illustrating a computing efficiency environment, in accordance with an exemplary embodiment of the present invention.

FIG. 1 is a functional block diagram illustrating a computing efficiency environment, generally designated 100, in accordance with one embodiment of the present invention. Computing efficiency environment 100 includes computing device 102 connected over network 112. Computing device 102 includes computing efficiency program 104, scheduled computing task 106, unscheduled computing task 108, and database 110.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to scheduled computing task 106, unscheduled computing task 108, and database 110 and is capable of executing computing efficiency program 104. Computing device 102 may include internal and external hardware components, as depicted and described in further detail with respect to FIG. 5.

In this exemplary embodiment, computing efficiency program 104, scheduled computing task 106, unscheduled computing task 108, and database 110 are stored on computing device 102. However, in other embodiments, computing efficiency program 104, scheduled computing task 106, unscheduled computing task 108, and database 110 may be stored externally and accessed through a communication network, such as network 112. Network 112 can be, for example, a local area network (LAN), a wide area network (WAN) such as the Internet, or a combination of the two, and may include wired, wireless, fiber optic or any other connection known in the art. In general, network 112 can be any combination of connections and protocols that will support communications between computing device 102, computing efficiency program 104, scheduled computing task 106, unscheduled computing task 108, and database 110, in accordance with a desired embodiment of the present invention.

In exemplary embodiments, computing efficiency program 104 warns a user initiating an unscheduled computing task (such as unscheduled computing task 108) that the unscheduled computing task will likely overlap with a scheduled computing task (such as scheduled computing task 106), thereby creating a situation of unsatisfactory computing performance. The operational processes used by computing efficiency program 104 are described in more detail in FIGS. 2 and 3.

In exemplary embodiments, scheduled computing task 106 is any scheduled computing task that utilizes computer resources that include one or more CPUs and memory. For example, scheduled computing task 106 is a task executed during a scheduled meeting such as an internet meeting involving screen sharing. Scheduled computing task 106 is also a scheduled task such as a virtual training event. Scheduled computing task 106 also includes tasks such as file back-up events that are regularly scheduled.

In exemplary embodiments, unscheduled computing task 108 is any computing task that is about to be executed by a user, which utilizes computer resources that include one or more CPUs and memory. Both unscheduled computing task 108 and scheduled computing task 106 are computing tasks that compete for processing and memory on computing device 102 or other remote computing devices.

In exemplary embodiments, database 110 contains data enabling computing efficiency program 104 to estimate one or more of: the level of CPU utilization, memory consumption, and execution time (i.e., "parameters") for one or both of: scheduled computing task 106 and unscheduled computing task 108. Database 110 is also a repository for data stored by computing efficiency program 104, the data including one or more of: the level of CPU utilization, memory consumption, and execution time for one or both of: scheduled computing task 106 and unscheduled computing task 108. This latter data is used by computing efficiency program to estimate parameters for future scheduled and unscheduled computing tasks.

Figure 2:
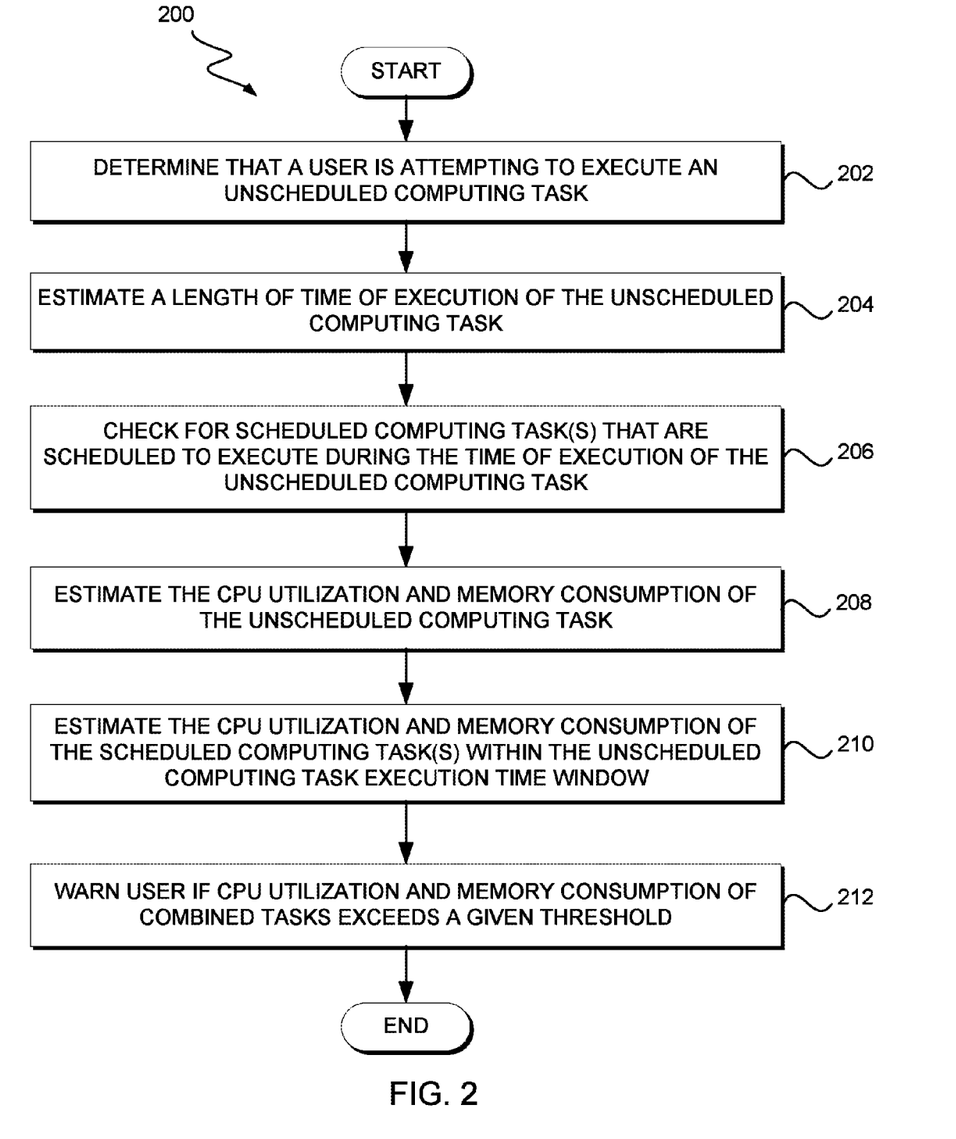
FIG. 2 illustrates operational processes for increasing computing efficiency, in accordance with an exemplary embodiment of the present invention.

FIG. 2 illustrates operational processes, generally designated 200, for increasing computing efficiency, in accordance with an exemplary embodiment of the present invention.

In step 202, computing efficiency program 104 determines that a user is attempting to execute unscheduled computing task 108 on computing device 102. In various embodiments, unscheduled computing task 108 is any computing task that, when executing, requires one or both of: CPU utilization and memory consumption. In some embodiments, opening software such as a word processor, spreadsheet, graphics program, etc. constitutes an unscheduled computing task such as unscheduled computing task 108. In other embodiments, unscheduled computing task 108 also includes the execution of software. For example, executing a report or any other program code are unscheduled computing tasks such as unscheduled computing task 108.

In step 204, computing efficiency program 104 estimates the length of time of execution (i.e., execution time or runtime) of unscheduled computing task 108. In various embodiments, computing efficiency program 104 estimates the execution time of unscheduled computing task 108 by searching for computing tasks that are substantially similar in database 110 where the substantially similar computing tasks have known execution times. The operational processes involved in computing efficiency program 104 estimations of the unscheduled computing task 108 execution time are discussed in more detail in FIG. 3.

In step 206, computing efficiency program 104 checks for one or more scheduled computing tasks such as scheduled computing task 106, which are scheduled to execute during the execution of unscheduled computing task 108 if the user initiates unscheduled computing task 108 at the current time. Scheduled computing tasks such as scheduled computing task 106 are any computing task that, when executing, require one or both of: CPU utilization and memory consumption. Scheduled computing tasks such as scheduled computing task 106 are computing tasks that are scheduled to be executed either automatically or manually for events such as a scheduled meeting, software update, computer backup, etc. Computing efficiency program 104 checks schedules of various applications that schedule computing tasks such as computing task 106. For example, computing efficiency program 104 will check calendar programs for meetings that involve a computing task such as computing task 106.

In step 208, computing efficiency program 104 estimates the CPU utilization and memory consumption of unscheduled computing task 108. In various embodiments, computing efficiency program 104 estimates the CPU utilization and memory consumption of unscheduled computing task 108 by searching for computing tasks that are substantially similar in database 110 where the substantially similar computing tasks have known parameters (i.e., one or both of: the CPU utilization, memory consumption). The operational processes involved in computing efficiency program 104 estimations of unscheduled computing task 108 parameters are discussed in more detail in FIG. 4.

In step 210, computing efficiency program 104 estimates the CPU utilization and memory consumption of scheduled computing task 106. In various embodiments, computing efficiency program 104 estimates the CPU utilization and memory consumption of scheduled computing task 106 by searching for computing tasks that are substantially similar in database 110 where the substantially similar computing tasks have known parameters (i.e., one or both of: the CPU utilization, memory consumption). The operational processes involved in computing efficiency program 104 estimations of scheduled computing task 106 parameters are discussed in more detail in FIG. 4.

In step 212, computing efficiency program 104 warns a user if the combined CPU utilization and memory consumption of unscheduled computing task 108 and the one or more scheduled computing tasks such as scheduled computing task 106 exceed a given threshold. For example, when CPU utilization exceeds 70%, the user may experience significant lag. Computing efficiency program 104 estimates that this situation will occur if the user opens or executes unscheduled computing task 108 prior to one or more scheduled computing tasks such as scheduled computing task 106.

Figure 3:
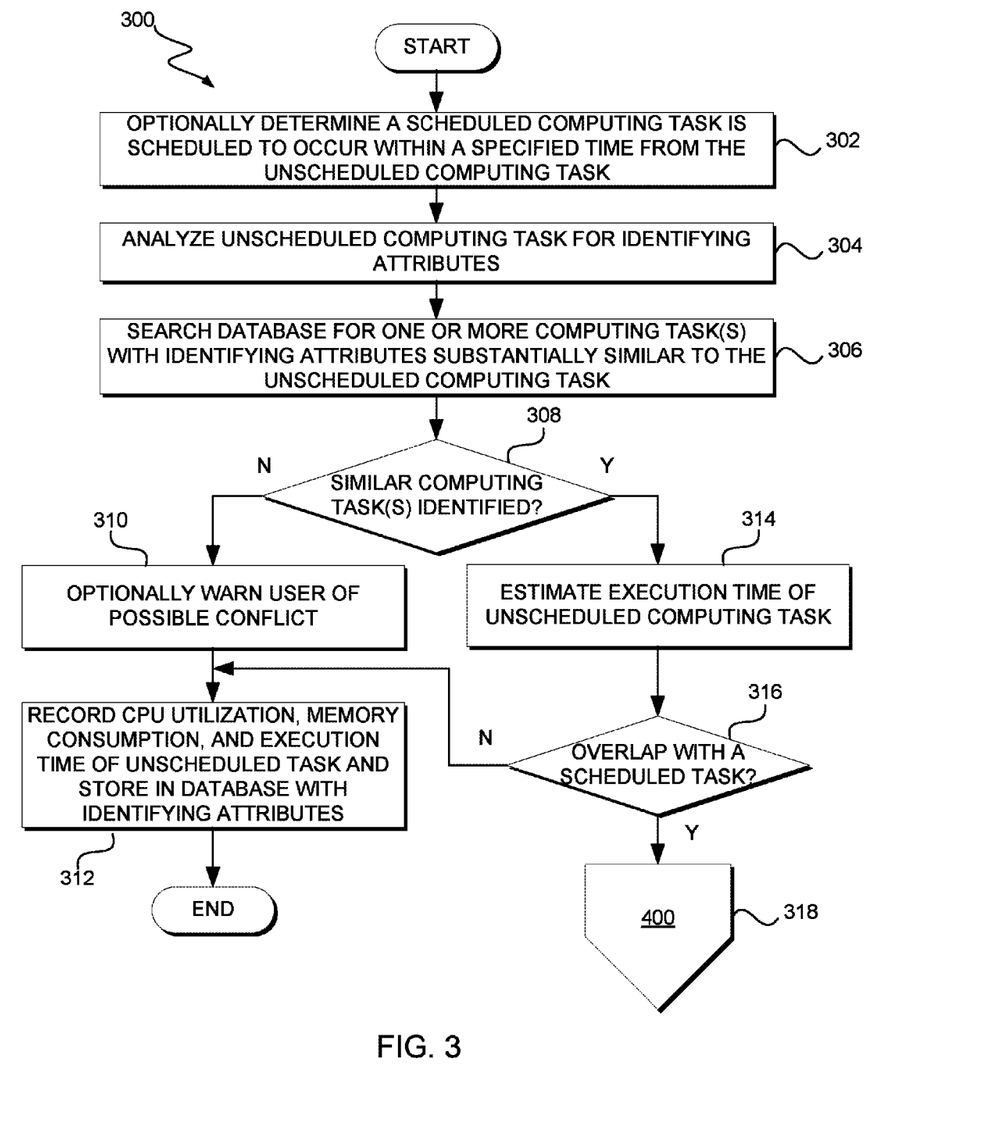
FIG. 3 illustrates a first part of operational processes for estimating computing resource consumption by a computing efficiency program, in accordance with an exemplary embodiment of the present invention.

FIG. 3 illustrates a first part of operational processes, generally designated 300, for estimating computing resource consumption by computing efficiency program 104, in accordance with an exemplary embodiment of the present invention.

In step 302, computing efficiency program 104 optionally determines that scheduled computing task 106 is scheduled to occur within a specified time from the unscheduled computing task. This optional step allows a user or administrator to save CPU utilization and memory consumption by only executing computing efficiency program 104 when a unscheduled computing task such as unscheduled computing task 108 and a scheduled computing task such as scheduled computing task 106 are likely to overlap with a certain probability. In various embodiments, this step is performed if the user or administrator sets a time constraint whereby a scheduled computing task such as scheduled computing task 106 must be scheduled to be initiated less than a specified amount of time in the future. This optional step causes computing efficiency program 104 to not proceed if no scheduled computing tasks such as scheduled computing task 106 are scheduled to occur before the specified amount of time.

In step 304, computing efficiency program 104 analyzes unscheduled computing task 108 for identifying attributes. Identifying attributes include, for example, file size, file type, programming language used, etc. In general, identifying attributes are metadata that are analyzed by computing efficiency program 104 to show correlations regarding the amount of CPU utilization, memory consumption, and execution time of a first unscheduled computing task relative to a second unscheduled computing task. In various embodiments, efficiency program 104 contains statistical subroutines that search for correlations between certain types of metadata in various unscheduled computing tasks and the amount of CPU and memory resources the unscheduled computing tasks consume as well as execution time. For example, efficiency program 104 investigates whether there is a correlation between file size and memory consumption for unscheduled computing tasks of a specific file type. Using statistical analysis, efficiency program 104 determines that there is such a correlation for unscheduled computing tasks of that specific file type and consequently uses file size as an identifying attribute for estimating memory consumption for unscheduled computing tasks of that particular file type.

In step 306, computing efficiency program 104 searches database 110 for one or more computing task(s) that are substantially similar to unscheduled computing task 108. In various embodiments, "substantially similar" indicates that metadata contained in the one or more computing task(s) found by computing efficiency program 104 will allow a correlation to be made between the consumption of computer resources by those one or more computer task(s) and the consumption of computer resources by unscheduled computing task 108.

In decision 308, computing efficiency program 104 determines whether one or more computer task(s) substantially similar to unscheduled computing task 108 have been identified in database 110. If no substantially similar computer tasks have been found (i.e., "N"), then computing efficiency program 104 proceeds to step 310. If one or more substantially similar computer tasks have been found (i.e., "Y"), then computing efficiency program 104 proceeds to step 314.

In step 310, computing efficiency program 104 optionally warns a user of a possible conflict with scheduled computing task 106 if the user chooses to execute unscheduled computing task 108 at that time. In exemplary embodiments, computing efficiency program 104 provides the optional warning in step 310 only if computing efficiency program 104 has optionally determined that scheduled computing task 106 is scheduled to occur within a specified time from unscheduled computing task 108 in step 302. The warning that is output by computing efficiency program 104 in step 310 indicates a conflict could occur between unscheduled computing task 108 and scheduled computing task 106, but there is no statistical data to indicate the probability of this conflict happening.

In step 312, computing efficiency program 104 determines the CPU utilization, memory consumption, and execution time of unscheduled computing task 108 upon execution and stores this data in database 110 along with identifying attributes of unscheduled computing task 108. The identifying attributes of unscheduled computing task 108 will allow correlation of the unscheduled computing task 108 CPU utilization, memory consumption, and execution time with future substantially similar unscheduled computing tasks. These correlations will lead to estimates of the future unscheduled computing tasks in terms of CPU utilization, memory consumption, and execution time.

In step 314, computing efficiency program 104 estimates the execution time of unscheduled computing task 108 based on correlation of one or more identifying attributes of unscheduled computing task 108 and one or more identifying attributes of substantially similar computing tasks found in the search of database 110 in step 306. For example, computing efficiency program 104 uses statistical analysis to determine that there is a correlation between file sizes and execution time for unscheduled computing tasks of a particular programming language. In step 314, computing efficiency program 104 uses that correlation, at least in part, to estimate the execution time of unscheduled computing task 108.

In decision 316, computing efficiency program 104 determines whether the execution time of unscheduled computing task 108 overlaps with a scheduled computing task such as scheduled computing task 106. Computing efficiency program 104 checks the unscheduled computing task 108 execution time window to determine whether a scheduled computing task such as scheduled computing task 106 is scheduled to begin before unscheduled computing task 108 is through executing. If computing efficiency program 104 determines there will be no overlap between unscheduled computing task 108 and a scheduled computing task such as scheduled computing task 106 (i.e., "Y"), then the user is not warned. When unscheduled computing task 108 is executed, computing efficiency program 104 determines the CPU utilization, memory consumption, and execution time of unscheduled computing task 108 and stores this data in database 110 along with unscheduled computing task 108 identifying attributes (i.e., step 312). If computing efficiency program 104 determines there will be an overlap between unscheduled computing task 108 and a scheduled computing task such as scheduled computing task 106 (i.e., "N"), then computing efficiency program 104 continues to off-page reference 318, i.e., the operational processes 400 described in FIG. 4.

Figure 4:
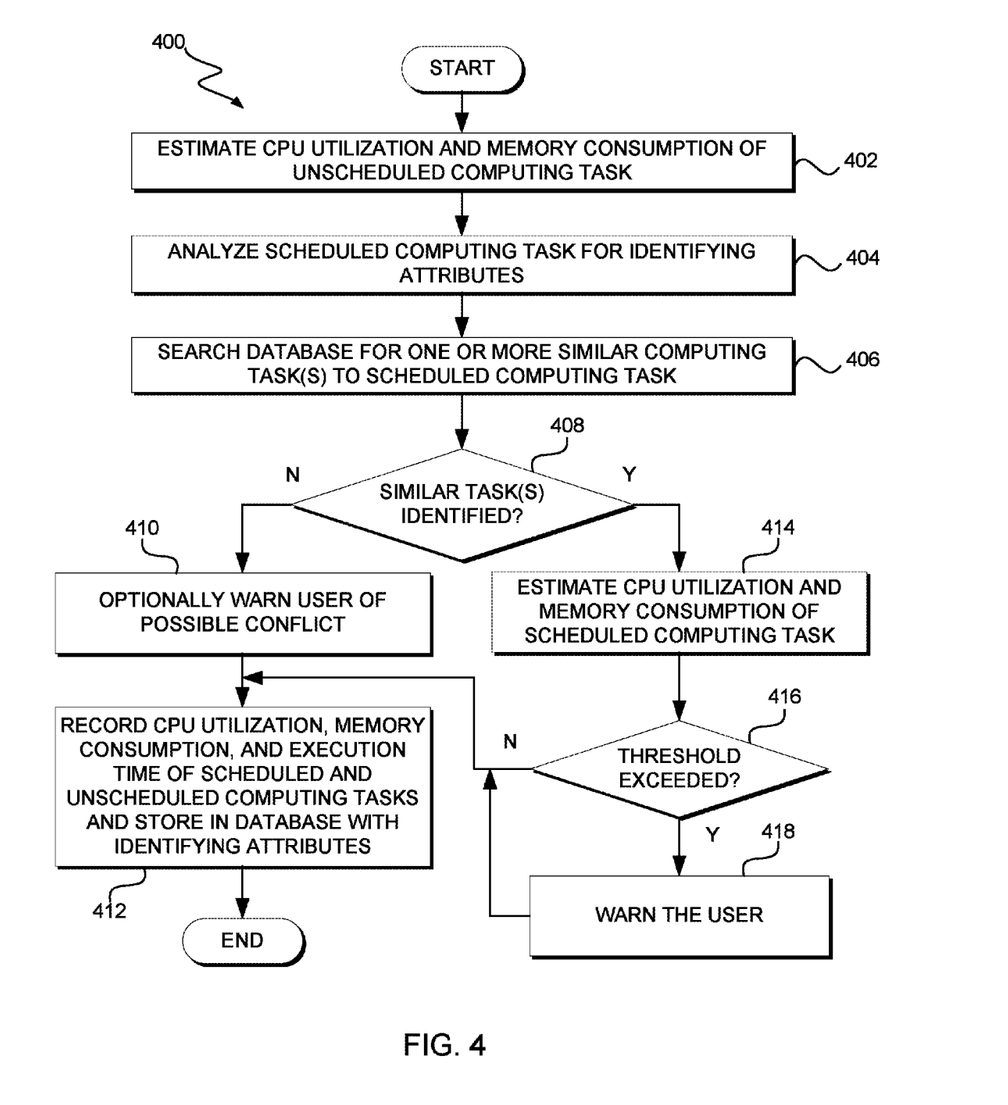
FIG. 4 illustrates a second part of operational processes for estimating computing resource consumption by a computing efficiency program, in accordance with an exemplary embodiment of the present invention.

FIG. 4 illustrates a second part of operational processes, generally designated 400, for estimating computing resource consumption by computing efficiency program 104, in accordance with an exemplary embodiment of the present invention.

In step 402, computing efficiency program 104 estimates one or both of: the CPU utilization and memory consumption of unscheduled computing task 108. By determining correlations between unscheduled computing task 108 identifying attributes and substantially similar identifying attributes of computing tasks stored in database 110, computing efficiency program 104 estimates one or both of: the CPU utilization and memory consumption of unscheduled computing task 108 from the known CPU utilization and memory consumption of the reference computing tasks found in step 306 (FIG. 3).

In step 404, computing efficiency program 104 analyzes scheduled computing task 106 for identifying attributes. For example, identifying attributes include file size, file type, programming language used, etc. In general, identifying attributes are metadata that allow correlations regarding the amount of CPU utilization, memory consumption, and execution time of a first scheduled computing task relative to a second scheduled computing task. In various embodiments, efficiency program 104 contains statistical subroutines that search for correlations between certain types of metadata in various scheduled computing tasks and the amount of CPU and memory resources the scheduled computing tasks consume. For example, efficiency program 104 investigates whether there is a correlation between file size and memory consumption for scheduled computing tasks of a specific file type. Using statistical analysis, efficiency program 104 determines that there is such a correlation for scheduled computing tasks of that specific file type and consequently uses file size as an identifying attribute for estimating memory consumption for scheduled computing tasks of that specific file type.

In step 406, computing efficiency program 104 searches database 110 for one or more computing task(s) that are substantially similar to scheduled computing task 106. In various embodiments, "substantially similar" indicates that metadata contained in the one or more computing task(s) found by computing efficiency program 104 will allow a correlation to be made between the consumption of computer resources by those one or more computer task(s) and the consumption of computer resources by scheduled computing task 106.

In decision 408, computing efficiency program 104 determines whether one or more computer task(s) substantially similar to scheduled computing task 106 have been identified in database 110. If no substantially similar computer tasks have been found (i.e., "N"), then computing efficiency program 104 proceeds to step 410. If one or more substantially similar computer tasks have been found (i.e., "Y"), then computing efficiency program 104 proceeds to step 414.

In step 410, computing efficiency program 104 optionally warns a user of a possible conflict with scheduled computing task 106 if the user chooses to execute unscheduled computing task 108 at that time. The optional warning is output by computing efficiency program 104 to indicate that unscheduled computing task 108 will overlap with scheduled computing task 106. However, without an ability to estimate the CPU utilization and memory consumption of scheduled computing task 106, computing efficiency program 104 cannot estimate whether the combined CPU utilization and memory consumption of both unscheduled computing task 108 and scheduled computing task 106 will exceed a specified threshold (decision 416, vide infra). In various embodiments, the optional warning in step 410 depends on the amount of CPU utilization and memory consumption estimated by computing efficiency program 104 in step 402. Thus, if the CPU utilization and memory consumption of unscheduled computing task 108 is estimated to exceed a secondary threshold that is lower than the specified threshold in decision 416, the optional warning in step 410 is triggered even if the CPU utilization and memory consumption of scheduled computing task 106 cannot be estimated by computing efficiency program 104. In exemplary embodiments, the secondary threshold that triggers the optional warning in step 410 is automatically set as a fractional amount of the specified threshold in decision 416.

In step 412, computing efficiency program 104 determines the CPU utilization, memory consumption, and execution time of unscheduled computing task 108 and scheduled computing task 106 upon their execution. Computing efficiency program 104 stores this data in database 110 along with identifying attributes of unscheduled computing task 108 and scheduled computing task 106. The identifying attributes of unscheduled computing task 108 and scheduled computing task 106 will allow correlation of their CPU utilization, memory consumption, and execution time with future substantially similar unscheduled computing tasks and scheduled computing tasks. These correlations will lead to estimates of the future unscheduled/scheduled computing tasks in terms of CPU utilization, memory consumption, and execution time.

In step 414, computing efficiency program 104 estimates the CPU utilization and memory consumption of scheduled computing task 106. By determining correlations between scheduled computing task 106 identifying attributes and substantially similar identifying attributes of computing tasks stored in database 110, computing efficiency program 104 estimates the CPU utilization and memory consumption of scheduled computing task 106 from the known CPU utilization and memory consumption of the reference computing tasks found in step 406.

In step 416, computing efficiency program 104 determines whether overlapping execution of unscheduled computing task 108 and scheduled computing task 106 will exceed a specified threshold of one or both of: CPU utilization and memory consumption. Exceeding the specified threshold creates, for example, lag time or an abnormal end to one or both programs. If the specified threshold is not exceeded (i.e., "N"), computing efficiency program 104 continues to step 412. If the specified threshold is exceeded (i.e., "Y"), computing efficiency program 104 warns the user in step 418. Regardless of the decision the user makes regarding the step 418 warning, when unscheduled computing task 108 and scheduled computing task 106 have been executed, computing efficiency program 104 will record one or more of: the CPU utilization, memory consumption, and execution time of one or both of unscheduled computing task 108 and scheduled computing task 106 in step 412.

Figure 5:
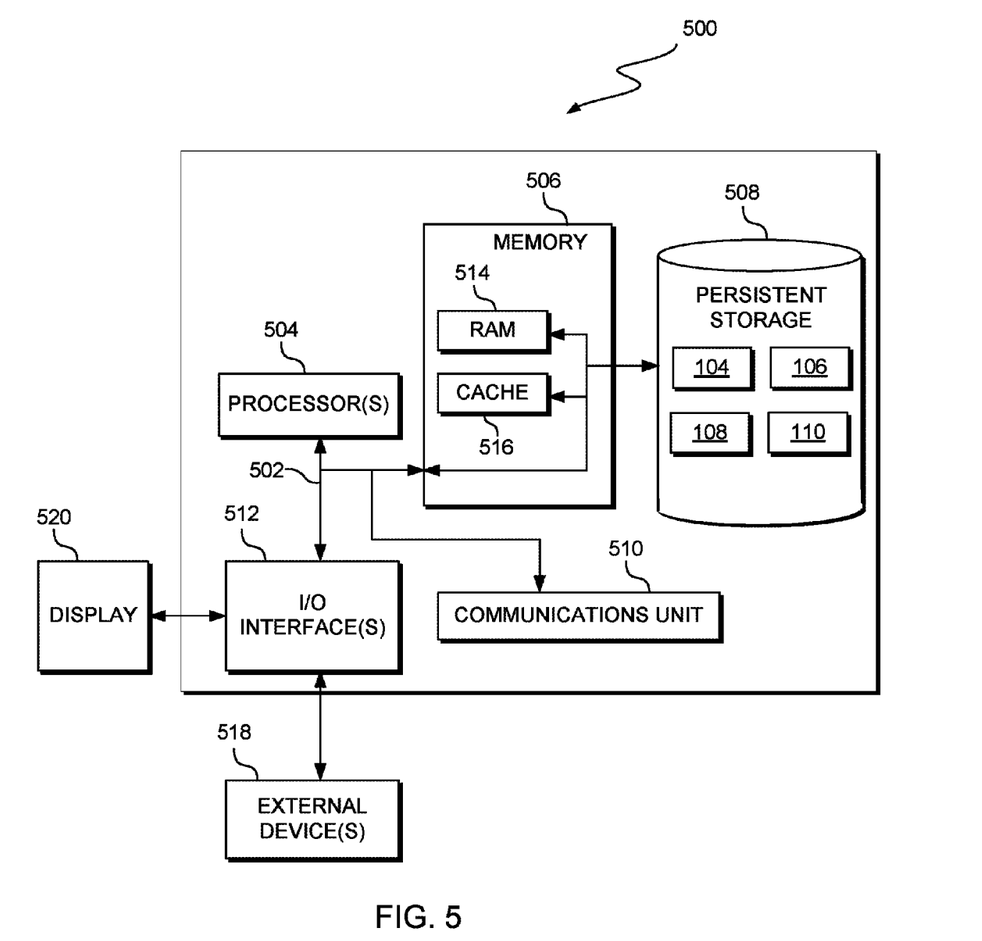
FIG. 5 depicts a block diagram of components of the computing device executing a computing efficiency program, in accordance with an exemplary embodiment of the present invention.

FIG. 5 depicts a block diagram, 500, of components of computing device 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Computing efficiency program 104, scheduled computing task 106, unscheduled computing task 108, and database 110 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 112. In these examples, communications unit 510 includes one or more network interface cards. Communications unit 510 may provide communications through the use of either or both physical and wireless communications links. Computing efficiency program 104, scheduled computing task 106, unscheduled computing task 108, and database 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., computing efficiency program 104, scheduled computing task 106, unscheduled computing task 108, and database 110, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   determining, by one or more processors, that an unscheduled computing task is about to be started by a user;
   execute the unscheduled computing task;
   estimating, by one or more processors, a total length of time of execution for the unscheduled computing task;
   based on the estimated length of time of execution for the unscheduled computing task, determining, by one or more processors, that a scheduled computing task is scheduled to execute while the unscheduled computing task is executing, wherein the scheduled computing task is scheduled to be executed automatically, wherein the scheduled computing task executes during execution of a plurality of other tasks; wherein the plurality of other tasks comprise: a task scheduled in a calendar program, a software update, and a computer backup;
   in response to a determination that the scheduled computing task is scheduled to execute while the unscheduled computing task is executing, warning, by one or more processors, the user that the unscheduled computing task will be executing when the scheduled computing task begins executing;
   analyzing, by one or more processors, at least one of the unscheduled computing task and the scheduled computing task for one or more first identifying attributes;
   searching, by one or more processors, a database and identifying one or more stored computing tasks wherein the one or more stored computing tasks are tasks that have been previously executed as a scheduled computing task or a unscheduled computing task that is substantially similar to the analyzed computing tasks and have one or more second identifying attributes; wherein the one or more first identifying attributes and the one or more second identifying attributes include a file size, a file type, and a program language used, and the length of time of execution for one or both of: the analyzed and previously executed unscheduled computing task and the analyzed and previously executed scheduled computing task;
   identifying, by one or more processors, a predictive correlation between at least one of the one or more first identifying attributes to at least one of the one or more second identifying attributes, wherein the predictive correlation allows an estimate to be made of one or more of: the utilization of processing and the memory consumption;

estimating based upon the predictive correlation, by one or more processors, one or both of: a utilization of processing and a memory consumption for one or both of: the unscheduled computing task and the scheduled computing task;

in response to one or both of: an estimated utilization of processing and an estimated memory consumption for the one or both of: the unscheduled computing task and the scheduled computing task, determining, by one or more processors, whether the one or both of: the utilization of processing and the memory consumption for the one or both of: the unscheduled computing task and the scheduled computing task exceed a threshold; and in response to a determination that the threshold will be exceeded, warning, by one or more processors, the user that the threshold will be exceeded.

* * * * *